Dec. 27, 1955  W. F. HERMAN ET AL  2,728,106
MEANS FOR PRODUCING OPTICAL ELEMENTS
Filed Sept. 8, 1950

INVENTORS
WILLIAM F. HERMAN
CHARLES A. CHABOT JR.
BY
Louis F. Gagnon
ATTORNEY

United States Patent Office 2,728,106
Patented Dec. 27, 1955

2,728,106

MEANS FOR PRODUCING OPTICAL ELEMENTS

William F. Herman, Sturbridge, and Charles A. Chabot, Jr., Worcester, Mass., assignors to American Optical Company, Southbridge, Mass., a voluntary association of Massachusetts Application September 8, 1950, Serial No. 183,694

15 Claims. (Cl. 18—39)

This invention relates to casting devices and has particular reference to improved means for producing optical elements from resinous materials.

When producing optical elements such as plastic lenses from resinous materials the perfection of the surfaces of the elements and the retention of the desired optical properties in the resultant elements are of high importance. However, prior art means and method of forming optical elements from resinous materials have generally embodied intricate, cumbersome and expensive equipment in order to establish and preserve the precise alignment of the mold halves necessary to incorporate the desired optical properties in the resultant elements.

It is, therefore, a primary object of this invention to provide novel means of a simple, efficient and inexpensive nature for casting precision optical elements from resinous materials.

Another object is to provide means of casting an optical element from resinous material through the provision of a mold device embodying a supporting fixture for carrying a pair of separate mold halves disposed in desired spaced relation whereby a supply of the resinous material placed between the mold halves will subsequently receive opposed surface shapes corresponding to the shapes of the adjacent surfaces of said mold halves.

Another object is to provide a mold device of the above character wherein the mold halves are so shaped that they may be moved, within limitations, without altering the optical properties of the resultant optical elements.

Another object is to provide a device of the above character wherein one of the mold halves, during polymerization of the resinous material and resultant shrinkage thereof, may be drawn toward the opposed mold half by the resinous material through its inherent propensity to adhere to the mold halves.

Another object is to provide a mold device of the above character wherein the mold halves are formed of glass having their surfaces ground and polished whereby the resultant optical elements will be provided with surfaces having a high degree of perfection.

Another object is to provide mold devices of the above character which may be used for casting optical elements such as lenses having substantially no power, predetermined amounts of power, prism, or other desired optical properties.

Another object is to provide a mold device of the above character wherein the supporting fixture is formed of two parts adjustable with respect to one another for controlling the thickness of the resultant optical elements.

Other objects and advantages of the present invention will become apparent from the following description taken in connection with the accompanying drawing, in which.

Figure 1:
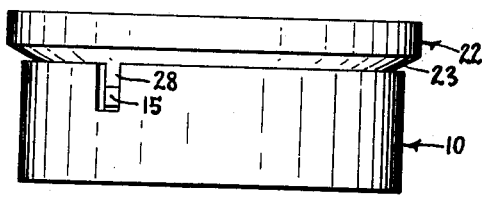
Fig. 1 is a front elevational view of a device embodying the present invention.
Figure 3:
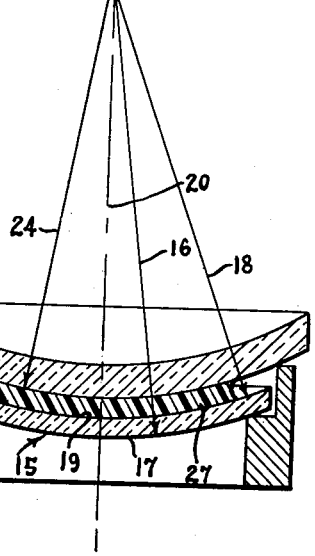
Fig. 3 is a sectional view taken on line 3—3 of Fig. 2.
Figure 2:
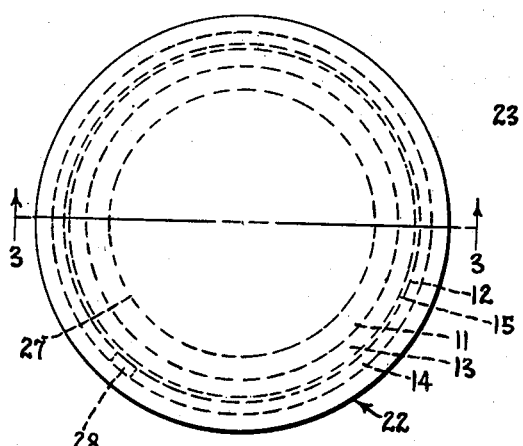
Fig. 2 is a top plan view of the device shown in Fig. 1.

Referring to the drawings wherein like characters of reference designate like parts throughout the several views, the embodiment of the invention illustrated in Figs. 1, 2 and 3 comprises a cylindrical supporting member 10 having a longitudinal hollow bore 11 therethrough. The bore 11 is provided with a portion 12 of greater diameter adjacent one end of the member 10, thereby forming an annular shelf 13 around the interior of the member 10. Thus the end 14 of the member 10 is shaped in the nature of a second annular shelf, with the shelf 13 being spaced a predetermined distance therefrom and lying throughout in a plane parallel with the plane of the end 14. The centers of the inner annular edge of the shelf 13 and the inner annular edge of the end 14 are coaxial with each other.

A mold half 15 preferably formed of glass is positioned upon the shelf 13. The mold half 15 is provided with a lower convex spherical surface 17 which engages the inner annular edge of the shelf 13 and has an upper optically polished concave spherical surface 19. The mold half 15 is further preferably circular in contour shape and has a diameter greater than the diameter of the inner edge of the shelf 13 but less than the diameter of the inner wall of the portion 12 of the bore. The mold half 15 further has its opposed side surfaces formed parallel, that is, the radius 16 of the convex surface 17 thereof is concentrically related with the radius 18 of the concave surface 19 and the center point about which said surfaces are generated is indicated at 21.

A second mold half 22 formed with a highly polished lower convex spherical surface 23 is adapted to set upon the annular end 14 of the member 10 with the convex surface 23 being in engagement with said end 14. The radius 24 of curvature of the surface 23 of the mold half 22 is of predetermined length in accordance with the radius of curvature of the surface 19 and the optical properties desired of the optical element to be formed and is swung about a center point 25.

Due to the fact that the inner annular edge of the shelf 13 and the inner annular edge of the end 14 are coaxial with each other as indicated by line 20 and that the surfaces 15 and 23 of the mold halves are spherical, the centers 21 and 25, respectively, will fall on said coaxial line 20 and will establish the resultant optical axis of the completed lens. The above arrangement is such that this optical edge will remain constant even if the mold elements 15 and 22 should shift laterally with respect to each other while remaining in engagement with the respective inner annular edges of the shelf 13 and end 14. This is due to the fact that the centers 21 and 25 will remain on the axis line 20 of said inner annular edges. The exposed outer surface 26 of the mold half 22 can be formed to any desired shape, and is shown concave in Fig. 3.

Since the depth of the portion 12 of the bore is carefull controlled, this will cause the mold halves 15 and 22 to be spaced apart accordingly and thereby control the thickness of the optical element to be formed therebetween. The adjacent surfaces 19 and 23 of the mold halves are preferably highly optically polished so that the resultant optical element will be provided with surfaces having a finish of high optical perfection.

In forming a substantially no power lens in a device of this character, mold halves 15 and 22 are selected which have the desired radii 16, 18 and 24 for transferring to the resultant lens the surface curvatures desired. For example, the surface 19 of the mold half 15 will have a radius 18 of approximately 6.00 diopters and the surface 23 of the mold half 22 will have a radius 24 of approximately 6.03 diopters. The supporting member 10 is so dimensioned as to space the mold halves 15 and 22 apart sufficiently to form the lens approximately 3 millimeters thick at its center. The material from which such a lens is formed has an index of refraction of approximately 1.50. Although the curves of the adjacent surfaces 22 and 19 are not identical, it will be understood that when the thickness of the resultant lens and the index of refraction of the material is controlled as specified above, the resultant lens will have substantially no power.

It will be understood that a lens can be provided with power, however, by selecting mold halves having the required difference of surface curvatures as is commonly known in the art. It is important in accordance with this invention, however, that the surfaces 17 and 19 of the lower mold half 15 be kept parallel.

After selecting the desired mold halves 15 and 22 to produce a lens having the desired power and positioning them in related positions upon the supporting member 10, a supply 27 of the resinous material having initially flowable characteristics is inserted between the mold halves. The resinous material may be any suitable thermosetting, thermoplastic or other artificial resinous substance which may be polymerized to result in the formation of a substantially hard, transparent plastic such as polycyclohexyl methacrylate, polystyrene, or polymethyl methacrylate. The selected resin can be either injected through an opening or notch 28 in the wall of the portion 12 of the supporting member 10 or may be placed upon the upper surface 19 of the mold half 15 before the mold half 22 is placed in position on the end 14 of the member 10.

In the usual manner of casting, application of heat to the device will cause polymerization of the resinous material and cause it to consequently take the shapes of the surfaces 19 and 23. The lens thus formed is then removed and subsequently provided with the desired contour size and shape. The opposed surfaces of the resultant lens, however, will be highly optically perfect due to the use of the highly polished glass surfaces 19 and 23.

It is to be understood, of course, that polymerization of the resinous material can be induced by chemical means or ultra-violet light rather than the application of heat, if desired.

It will be noted here that since resinous materials shrink during polymerization, the lens 27 when shrinking will draw the lower mold half upwardly off the shelf 13 due to the inherent tenacity of the resinous material. In devices where movement of the mold halves is restrained the shrinkage will result in a tendency for the resinous material to pull away from the mold halves in some areas, thus resulting in imperfectly formed optical surfaces. This shrinkage, however, is compensated for in order to arrive at the finished thickness desired.

Figure 4:
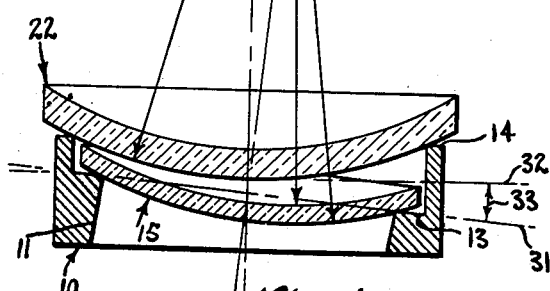
Fig. 4 is a sectional view generally similar to Fig. 3 illustrating a modification of the invention.

In cases where it is desired to provide prism in a lens being formed in accordance with the presently described procedure, the supporting member 10 is modified slightly as shown in Fig. 4. In this modification the lower bore 11 in the member 10 is formed at a predetermined angle with respect to the longitudinal axis of the member 10. The normal axis of the member 10 and of the upper mold half 22 is indicated by line 29 in Fig. 4. However, by angling the bore 11 to the desired inclination, the axis of which is indicated by line 30, and forming the shelf 13 on a plane 31, normal to the axis 30, and at a predetermined angle with respect to the normal horizontal plane indicated by line 32, this will cause the inner edge of the shelf 13 to form a true circle when viewed along the axis line 30 rather than an ellipse as would be the case when forming the bore on the axis 29 line and inclining the plane 31 of the shelf to the desired angle. In so doing, it is evident that the angle 33 formed by the plane of lines 31—32 will be equal to the angle 34 formed by the axis lines 29—30.

With this modified construction, the center point 21 of the lower mold half 15 will lie on the axis line 30 while the center point 25 of the upper mold half 22 will remain on the axis line 29. In this way, it will be understood that the angles 33 and 34 can be controlled to introduce the desired amount of prism in a lens to be formed in the above described manner.

It is to be understood that although the foregoing description refers to alteration of the plane 32 of the shelf 13 to produce prism in the resultant lens, it is conceivable that the plane 32 of the shelf can be maintained while the plane of the annular end 14 may be altered to produce the desired results. In the latter case, the axis of the bore portion 12 would assume the angle, for example, of line 30 while the axis of bore portion 11 would remain constant.

Figure 5:
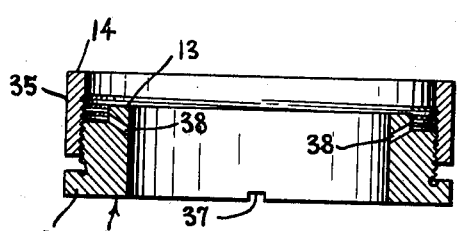
Fig. 5 is a sectional view taken through the center of a supporting member of the mold device and illustrating a modification thereof.

It is to be understood that various means and methods may be used to provide a supporting member which can be adjusted to form lenses of different thicknesses. A preferred means is illustrated in Fig. 5 wherein the member 10 is formed of two separate pieces, an upper tubular or ring-like portion 35 which is internally threaded and a lower ring-like portion 36 which is externally threaded for cooperative engagement with the upper portion 35. The portion 36 thus can be adjusted within portion 35 so as to position the shelf 13 thereof in desired spaced relation with the end 14 of the portion 35 and thereby cause the adjacent surfaces of the mold halves 15 and 22, when assembled therewith, to be spaced in accordance with the thickness desired of the resultant lens.

In instances where it is desired to polymerize the resinous material in the presence of a gas such as $CO_2$ when casting an optical element, the desired atmosphere can be achieved by admitting the gas into the interior of the supporting member 10 through the notch 28 (Fig. 1) or through one or more openings 37 in the lower portion of the supporting member 10 (Fig. 5). The gas will pass from the interior of the member 10 through ports 38 connecting said interior with the shelf 13 from which it can pass around the edge of the lower mold half 15 to the resinous material 27.

Although the end 14 of the supporting member 10 and the inner edge of the shelf 13 are formed continuous as described to provide unbroken ring-like seats for the respective mold halves 15 and 22, it is to be understood that if desired they may be shaped so as to provide a series of points of suspension numbering at least three or more rather than being continuous which would support the mold halves in the manner desired.

From the foregoing description it will be seen that novel means and method have been provided for accomplishing all of the objects and advantages of this invention through the provision of an improved molding device for efficiently and accurately forming optical elements from resinous materials.

While the novel features of the invention have been shown and described and are pointed out in the annexed claims, it will be understood that various omissions, substitutions and changes in and widely different embodiments of the invention can be made without departing from the scope thereof and it is intended that all matters contained in the above description and shown in the accompanying drawing be interpreted as illustrative and not in a limiting sense.

We claim:
1. A device for use in casting optical elements comprising the combination of a supporting member having a pair of vertically spaced aligned annular shelves, and a pair of separate mold halves adapted to be loosely positioned upon the respective shelves one over the other, the lower mold half having opposed concentric spherical surfaces and the upper mold half having its under surface of spherical shape, said shelves being spaced a predetermined distance apart to control the spacing between the adjacent surfaces of said mold halves in accordance with the thickness desired of the resultant optical elements, and lying in respective planes disposed with respect to one another in accordance with optical properties desired in the resultant optical elements.

2. In a device for use in casting optical elements, the combination of a supporting member having an upstanding annular portion the end of which lies in a predetermined plane, and an annular shelf the plane of which is disposed below the plane of the end of said annular portion in accordance with the thickness and optical characteristics desired of the resultant optical elements, and a pair of separate mold halves adapted to be loosely carried by said supporting member and disposed in adjacent spaced relation, one of said mold halves being adapted to be positioned upon the end of said upstanding annular portion and the other of which is adapted to be positioned on said shelf, said first mold half having at least its under surface of convex spherical shape, and the other mold half having convex and concave opposed surfaces both spherical and concentric.

3. In a device for use in casting optical elements, the combination of a supporting member having an upstanding annular portion the end of which lies in a predetermined plane and an annular shelf the plane of which is disposed below the plane of the end of said annular portion in accordance with the thickness and optical characteristics desired of the resultant optical elements, and a pair of separate mold halves adapted to be loosely carried by said supporting member and disposed in adjacent spaced relation, one of said mold halves being adapted to be positioned upon the end of said upstanding annular portion and the other of which is adapted to be positioned on said shelf, the adjacent surfaces of said mold halves being provided with highly polished surfaces having spherical curvatures controlled according to the power desired of the resultant optical elements, the mold half adapted to be positioned on said shelf further having a spherical curvature on its opposed surface which is substantially parallel to the curvature on the surface adjacent said first mold half.

4. In a device of the character described for forming optical elements, the combination of a cylindrical supporting member having a longitudinal bore therethrough and an annular shelf formed within said bore, the end of said member forming an annular shelf having its plane located above, and in predetermined spaced relation with, the plane of the annular shelf within said bore, a mold half adapted to be loosely supported by said annular shelf within said bore and having opposed substantially parallel spherical curved surfaces, one of which is adapted to abut upon said shelf and the other of which is shaped to the reverse curvature desired of one side of the resultant optical elements, and a second mold half adapted to be loosely positioned upon the annular shelf formed by the end of said supporting member and having its contacting surface of spherical curvature and its surface directed toward said first mold half shaped to the curvature desired of the opposed surface of said resultant optical elements.

5. In a device of the character described for forming optical elements, the combination of a cylindrical supporting member having a longitudinal bore therethrough and an annular shelf formed within said bore, the end of said member forming an annular shelf having its plane located in predetermined vertically spaced relation with the plane of the annular shelf within said bore, a mold half adapted to be loosely supported by said annular shelf within said bore and having opposed substantially parallel spherical curved surfaces, one of which is adapted to abut upon said shelf and the other of which is shaped to the reverse curvature desired of one side of the resultant optical elements, and a second mold half adapted to be loosely positioned upon the annular shelf formed by the end of said supporting member and having a spherical curvature on its surface directed toward said first mold half shaped to the curvature desired of the opposed surface of said resultant optical elements, said first mold half being of a diameter smaller than the diameter of the portion of the bore above the shelf within the bore and larger than the diameter of the inner edge of said shelf whereby, while in engagement with said shelf throughout the entire length, thereof, said first mold half may move within said bore with no alteration of the curvature of the upper surface thereof with respect to said second mold half, and said second mold half being substantially larger in diameter than the inner edge of the shelf formed by the end of said supporting member whereby, while in engagement with said shelf throughout the entire length thereof, said second mold half may move with no alteration of the curvature of its surface within said annular shelf.

6. In a device of the character described for forming optical elements, the combination of a cylindrical supporting member having a longitudinal bore therethrough and an annular shelf formed within said bore, the end of said member forming an annular shelf having its plane located in predetermined vertically spaced relation with the plane of the annular shelf within said bore, a mold half adapted to be loosely supported by said annular shelf within said bore and having opposed substantially parallel spherical curved surfaces, one of which is adapted to abut upon said shelf and the other of which is shaped to the reverse curvature desired of one side of the resultant optical elements, and a second mold half adapted to be loosely positioned upon the annular shelf formed by the end of said supporting member and having a spherical curvature on its surface directed toward said first mold half shaped to the curvature desired of the opposed surface of said resultant optical elements, said supporting member further having ports formed therein for permitting flow of gas from exteriorly of the device to the optical element being formed.

7. A device of the character described for use in forming optical elements comprising the combination of a supporting structure having a pair of spaced annular shelves, one located below the other, and a pair of separate mold halves loosely resting on the respective annular shelves, the lower mold half having concentric spherical surfaces and the upper mold half having the lower surface of spherical shape, with the spacing between the adjacent surfaces of said mold halves being in accordance with the thickness desired of the resultant optical elements to be formed.

8. A device of the character described for use in forming optical elements comprising the combination of a supporting structure having a pair of spaced annular shelves, one located below the other, and a pair of separate mold halves each having opposed substantially concentric spherical surfaces and loosely resting on the respective annular shelves with the spacing between the adjacent surfaces of said mold halves being in accordance with the thickness desired of the resultant optical elements to be formed.

9. A device of the character described for use in forming optical elements comprising a pair of separate mold halves, each having a surface of the shape desired to be formed on the respective sides of the optical elements, means peripherally engaging said mold halves for supporting one above the other and in positive spaced relation with each other, the portion of the under surface of said two mold halves adjacent their periphery which is to be engaged by said respective means being of convexed spherical curvature, and the lower mold half being loosely supported and free to move toward the upper half, said lower mold half having an upper surface of concave spherical shape which is substantially concentric with the convex spherical curved peripheral portion of its under surface, said surface, in addition to providing the surface shape desired on one side of the optical element, further functioning as a receptacle for the material from which the optical element is to be formed, and said loosely mounted lower mold half being moveable in response to the shrinkage of the material to control the surface texture and resultant shape of the adjacent side of the optical element being cast.

10. A device of the character described for use in forming optical elements comprising a pair of separate mold halves, each having a surface of the shape desired to be formed on the respective sides of the optical element, means peripherally engaging said mold halves for supporting one above the other and in positive spaced relation with each other, the under surface of the two halves each being substantially spherical and convexed, and the lower half being loosely supported and free to move toward the upper half, said lower half having an upper concave surface of spherical shape and substantially concentric with the convex spherical surface on its opposed side, which concave surface in addition to providing the surface shape desired on one side of the optical element, functions as a receptacle for the material from which the optical element is to be formed, whereby the two mold halves will be substantially self-aligning and the loosely mounted lower mold half will move in response to the shrinkage of the material and in addition to controlling the surface texture will control the resultant shape of the adjacent side of the article.

11. A lens casting device of the character described comprising a pair of separate mold halves and supporting structure therefor embodying supporting means spaced to engage about the under side of each of said mold halves to support one above the other, the lower mold half being of convexo-concave shape with opposed substantially concentric spherical surfaces and the other mold half having at least the surface portion thereof adapted to rest on its supporting means of spherical curvature, and the supporting means for engaging the under surfaces of the respective mold halves defining a pair of planes disposed with respect to each other in accordance with the relation desired of the surfaces of the lens to be cast.

12. A lens casting device of the character described comprising a pair of separate mold halves and supporting structure therefor embodying supporting means spaced to engage the under side of said mold halves adjacent the periphery thereof and support one above the other, the lower mold half being of convexo-concave shape with opposed substantially concentric spherical surfaces and the other mold half having at least its surface portion adapted to rest on its supporting means formed to a spherical curvature, the supporting means for engaging the under surfaces of the respective mold halves defining a pair of planes disposed in substantially parallel relation with each other whereby the lens cast will be substantially free of prism.

13. A lens casting device of the character described comprising a pair of separate mold halves and supporting structure therefor embodying supporting means disposed in spaced planes and each having the supporting portions thereof lying in a path defining a circle to engage about the under side of the respective mold halves adjacent the periphery thereof and to locate one mold half above the other in position to permit casting a lens therebetween, the lower mold half being of concavo-convex shape with opposed substantially concentric spherical surfaces, and the upper mold half having at least the surface portion thereof adjacent its periphery which is adapted to rest on the respective one of said supporting means being formed to a spherical curvature, the thickness of said lower mold half being related to the space between said supporting means in accordance with the thickness of the lens to be cast, and said supporting means defining a pair of planes disposed with respect to each other in accordance with the relation desired of the surfaces of said lens to be cast.

14. A lens casting device of the character described comprising a pair of separate mold halves and supporting structure therefor embodying supporting means located in spaced aligned relation to locate one mold half above the other in position to permit casting a lens therebetween, the supporting means for the lower mold half defining a plane and the upper mold half being held by its supporting means so that its inner molding surface lies in a predetermined relation with respect to said plane in accordance with the desired relation of the surfaces of the lens to be cast, and the lower mold half being of concavo-convex shape with opposed substantially concentric spherical surfaces and having the under surface portion thereof adjacent its periphery to loosely rest on its respective supporting means, and the thickness of said lower mold half being related to the space between its supporting means and the molding surface of the upper mold half in accordance with the thickness of the lens to be cast.

15. A lens casting device of the character described comprising a pair of separate mold halves and supporting structure therefor embodying supporting means located in superposed spaced aligned relation to locate one mold half above the other in position to permit casting a lens therebetween, the supporting means for the lower mold half defining a plane and the upper mold half being held by its supporting means so that its inner molding surface lies in a predetermined relation with respect to said plane in accordance with the desired relation of the surfaces of the lens to be cast, and the lower mold half having at least the surface portion of its underside adjacent its periphery which is to be engaged by the supporting means formed of convex spherical shape and having its upper surface of concave spherical shape, said convex and concave shaped surfaces being also substantially concentric, and said lower mold half having said under surface portion thereof adjacent its periphery loosely resting on its respective supporting means, the thickness of said lower mold half being related to the space between its supporting means and the molding surface of the upper mold half in accordance with the thickness of the lens to be cast.

References Cited in the file of this patent

UNITED STATES PATENTS

| Number | Name | Date |
|---|---|---|
| 2,154,639 | Rohm et al. | Apr. 18, 1939 |
| 2,233,057 | Luce | Feb. 25, 1941 |
| 2,328,525 | Egolf | Aug. 31, 1943 |
| 2,390,129 | Shobert | Dec. 4, 1945 |
| 2,404,314 | Rogers | July 16, 1946 |
| 2,406,361 | Fairbank et al. | Aug. 27, 1946 |
| 2,542,386 | Beattie | Feb. 20, 1951 |